United States Patent
Griffin et al.

(10) Patent No.: US 12,197,315 B2
(45) Date of Patent: Jan. 14, 2025

(54) SOFTWARE TESTING USING A QUANTUM COMPUTER SYSTEM

(71) Applicant: RED HAT, INC., Raleigh, NC (US)

(72) Inventors: Leigh Griffin, Waterford (IE); Veera Raghava Beri Reddy, Bengaluru (IN); Srinivasa Bharath Kanta, Bangalore (IN)

(73) Assignee: Red Hat, Inc., Raleigh, NC (US)

( * ) Notice: Subject to any disclaimer, the term of this patent is extended or adjusted under 35 U.S.C. 154(b) by 91 days.

(21) Appl. No.: 17/864,493

(22) Filed: Jul. 14, 2022

(65) Prior Publication Data

US 2024/0020221 A1    Jan. 18, 2024

(51) Int. Cl.
*G06F 9/44* (2018.01)
*G06F 11/36* (2006.01)
*G06N 10/80* (2022.01)

(52) U.S. Cl.
CPC ...... *G06F 11/3688* (2013.01); *G06F 11/3684* (2013.01); *G06N 10/80* (2022.01)

(58) Field of Classification Search
CPC .. G06F 11/3688; G06F 11/3684; G06N 10/80
See application file for complete search history.

(56) References Cited

U.S. PATENT DOCUMENTS

| | | | |
|---|---|---|---|
| 10,678,678 B1 * | 6/2020 | Tsoukalas | G06F 11/3664 |
| 10,997,519 B2 | 5/2021 | Gunnels et al. | |
| 11,086,665 B2 | 8/2021 | Griffin et al. | |
| 2011/0295226 A1 | 12/2011 | Shohat et al. | |
| 2020/0117764 A1 | 4/2020 | Zuccarelli et al. | |
| 2020/0125402 A1 * | 4/2020 | Griffin | G06F 15/16 |
| 2021/0334237 A1 | 10/2021 | Coady et al. | |
| 2021/0374307 A1 * | 12/2021 | Haener | G06F 30/20 |
| 2021/0406747 A1 | 12/2021 | Coady et al. | |
| 2022/0027323 A1 | 1/2022 | Coady et al. | |
| 2023/0244459 A1 * | 8/2023 | Zou | G06F 8/41 717/140 |

* cited by examiner

*Primary Examiner* — Hang Pan
(74) *Attorney, Agent, or Firm* — Kilpatrick Townsend & Stockton LLP

(57) ABSTRACT

In one example described herein a system can receive, by a server, a software test suite comprising a plurality of data files. Each data file of the plurality of data files can correspond to a test of the software test suite. The system can generate, by the server, a mapping that assigns, for each data file, a qubit of a quantum computer system to the data file. The system can generate, by the server, a quantum assembly language (QASM) file that indicates the mapping and one or more properties associated with the qubit for each data file. The system can send, by the server, the QASM file to the quantum computer system for execution by the quantum computer system. The system can cause, by the server, an action based on an output generated by the quantum computer system.

20 Claims, 3 Drawing Sheets

SOFTWARE TESTING USING A QUANTUM COMPUTER SYSTEM

TECHNICAL FIELD

The present disclosure relates generally to quantum computer systems. More specifically, but not by way of limitation, this disclosure relates software testing using a quantum computer system.

BACKGROUND

Quantum computers perform computations utilizing quantum-mechanical phenomena, such as superposition, interference, and entanglement. Unlike classical computers that process data encoded in binary bits, each of which is in one of two definite states ("0" or "1"), quantum computers process data in units of quantum bits (qubits) that can be in a superposition of states. "Superposition" refers to the ability of each qubit to represent both a "0" and "1" at the same time. The qubits in superposition can be correlated with each other (referred to as "entanglement"). That is, the state of a given qubit (whether it is a "0" or "1") can depend on the state of another qubit. A quantum computer with N qubits can be in a superposition of up to $2^N$ states simultaneously. Compared to the classical computers that can only be in one of these $2^N$ states at a particular time, quantum computers may solve difficult problems that are infeasible using classical computers.

DETAILED DESCRIPTION

Figure 1:
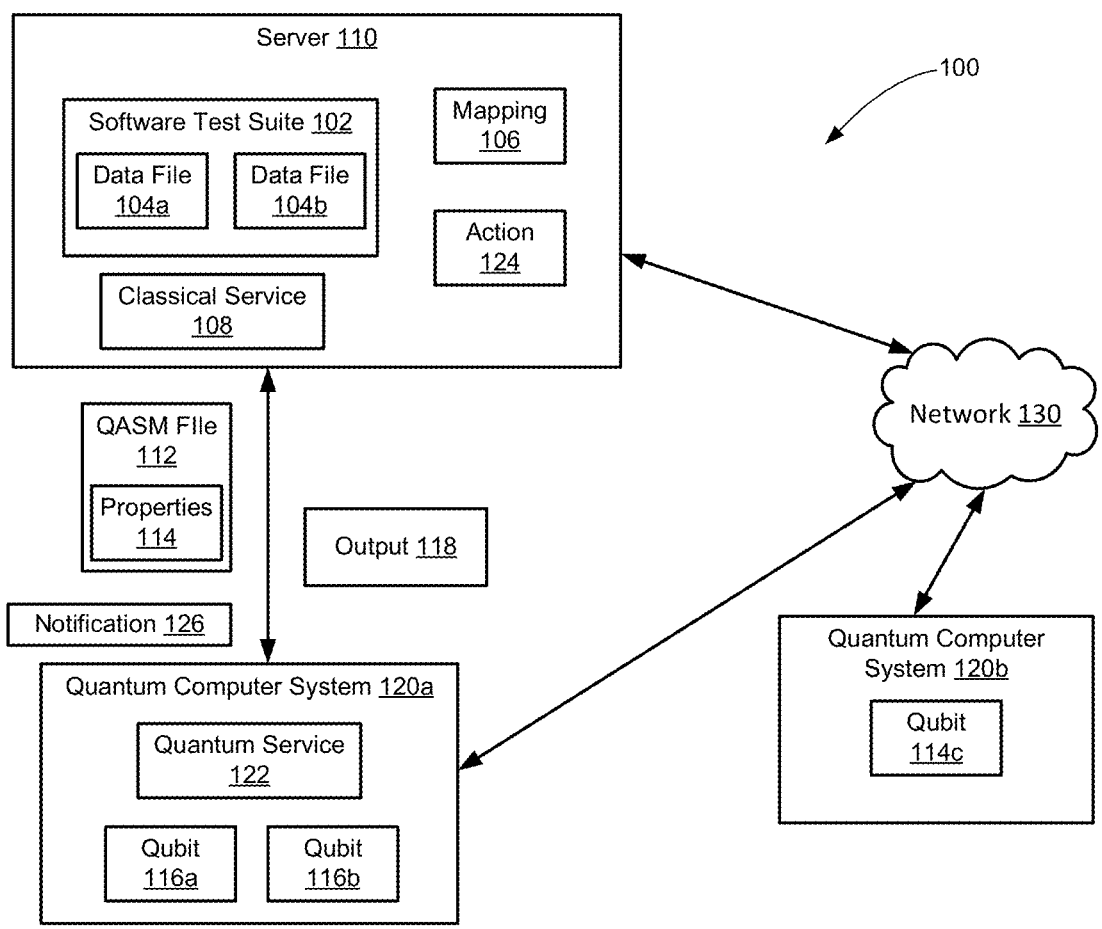
FIG. 1 is a block diagram of an example of a system for software testing using a quantum computer system according to one example of the present disclosure.

Software development often involves using a classical computer system to test a software application to ensure that the software application is bug-free and complies with certain standards. A set of test cases can be generated for a software application to determine whether the software application functions as desired. A number of dependent variables in the software application can affect the number of test cases involved in covering all possible scenarios. To reduce the number of test cases, boundary value analysis may be used, where test cases are only generated at the boundaries of an input domain where errors are most likely to occur. Whether all test cases or a subset of test cases, such as boundary test cases, are being tested, classical computer systems are often inefficient and use excessive computing resources.

Some examples of the present disclosure can overcome one or more of the abovementioned problems by providing a system that uses a quantum computer system for software testing. The system can receive a software test suite that includes data files corresponding to test cases of the software test suite. Each data file can correspond to one test case. The system can generate a mapping that assigns a qubit of a quantum computer system each data file. The system can then generate a quantum assembly language (QASM) file that indicates the mapping and one or more properties associated with the qubit for each data file. The system can provide the QASM file to the quantum computer system for execution by the quantum computer system. In addition, the system can cause an action based on an output generated by the quantum computer system in response to the execution of the QASM file. The output can indicate successes and failures of the test cases and the action can depend on the successes and failures. The quantum computer system can perform the tests more quickly than a classical computer system, so overall computing resources involved in evaluating a software application can be reduced.

As a particular example, a software application may be developed for verifying dates of a calendar year. During testing, test cases can be generated to evaluate the ability of the software application to verify dates. For example, a first test case may be for the date Feb. 29, 2022 and a second test case may be for the date Feb. 29, 2024. A classical computer system can receive a software test suite including two data files associated with the two test cases. The classical computer system can map each data file to a qubit of a quantum computer system and generate a QASM file that indicates the mapping. Properties, such as a polarization, a spin, and entanglement, may also be specified in the QASM file. During the testing of the software application, the quantum computer system can receive and execute the QASM file and generate an output indicating successes and failures of the test cases. For the two test cases of the example software test suite, the first test case is expected to fail and the second test case is expected to succeed, since 2022 is not a leap year and 2024 is a leap year. So, if the output indicates failure of the first test case and success of the second test case, the classical computer system can determine that the software application functions as desired and can be packed and pushed for production. Otherwise, if the output indicates a different result for either or both of the test cases, the classical computer system can determine that the software application does not function as desired, so a code push of the software application may be halted or delayed so that the errors in the software application can be fixed. Using the quantum computer system to perform the evaluation of the test cases can reduce time and computing resources involved in software application development.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

FIG. 1 is a block diagram of an example of a system 100 for software testing using a quantum computer system according to one example of the present disclosure. The system 100 can include a server 110 and one or more quantum computer systems, such as quantum computer systems 120*a-b*. The server 110 can include a classical service 108 and at least one of the quantum computer systems 120*a-b* can include a quantum service 122. Each of the classical service 108 and the quantum service 122 can work in conjunction to coordinate testing of a software application. The server 110 and the quantum computer systems 120*a-b* can communicate via a network 130, such as a local area network (LAN) or the Internet.

In an example, the server 110 can coordinate testing of software applications on the quantum computer systems 120a-b. For instance, the server 110 can receive a software test suite 102 of tests that are to be executed to evaluate a software application prior to the software application being made available for use. The software test suite 102 may include all test cases that are to be evaluated for a software application or boundary value test cases for the software application. Each test of the software test suite 102 can be a data file, such as data files 104a-b in FIG. 1. Although the software test suite 102 is illustrated as including two data files in FIG. 1, the software test suite 102 may include tens or hundreds of data files in other examples. Each of the data files 104a-b can represent a combinatorial test involved in validating overall correctness of a software application from a functional perspective.

To test the data files 104a-b, the classical service 108 can monitor and discover the software test suite 102. For example, the server 110 may receive the software test suite 102 from a remote storage or may receive a reference to retrieve the software test suite 102 from a database. Upon receiving the software test suite 102, the classical service 108 can parse the software test suite 102 and determine a number of data files 104a-b in the software test suite 102. For instance, the classical service 108 can determine that the software test suite 102 includes two data files 104a-b, and therefore includes two test cases.

The classical service 108 can generate a mapping 106 that assigns the data files 104a-b to qubits 116 of the quantum computer systems 120a-b. Each data file 104 can be mapped to a qubit 116, so the classical service 108 can contact the quantum service 122 with an indication of the number of qubits that are to be locked down for the software test suite 102. The quantum service 122 can generate an assignment for each data file 104 to a qubit 116. For example, the quantum service 122 can assign data file 104a to qubit 116a and data file 104b to qubit 116b of the quantum computer system 120. The quantum service 122 may assign the qubits 116 based on an availability of the qubits 116. That is, the first qubits that are determined to be available may be assigned to the data files 104a-b. Additionally or alternatively, the quantum service 122 may assign the qubits 116 based on a material of the qubits 116 or a location of qubits 116 within the quantum computer systems 120a-b. Specific qubits may be reserved due to physically-fixed positions that the qubits have within the quantum computer systems 120a-b. The physical positions of qubits within the quantum computer system 120a-b may impact the behavior of the qubits. For example, it may be desirable to assign qubits which are physically close together or physically distant to influence their affinity for entanglement. Once the quantum service 122 determines the assignment, the quantum service 122 can mark the assigned qubits as owned by a service run with a specific process identifier.

If one quantum computer system (e.g., quantum computer system 120a) lacks sufficient qubits for the data files 104, the quantum service 122 can assign the data files 104 to multiple quantum computer systems. For example, if qubit 116b is locked down for another operation, the quantum service 122 may assign data file 104a to qubit 116a of the quantum computer system 120a and data file 104b to qubit 116c of the quantum computer system 120b.

In some examples, the classical service 108 may additionally notify the quantum service 122 about other characteristic of the software test suite 102 that the quantum service 122 can use to assign qubits 116 to data files 104. The number of data files 104 may indicate that increased heat of the quantum computer system(s) 120 executing the data files 104 is expected due to the number of data files 104 being large (e.g., greater than one-hundred). So, the quantum service 122 can assign the data files 104 to qubits 116 having properties resilient to noise since noise can lead to increased heat. Additionally or alternatively, the characteristic may indicate an execution approach for the software test suite 102, such as a resilience to failure, reduced noise, or increased speed. So, the quantum service 122 can assign the qubits 116 according to the characteristic. As an example, the quantum service 122 may assign the data files 104 to qubits 116 being made of a material that is resilient to noise. The quantum computer systems 120a-b may have qubits of different materials that may be selected for different behavioral dispositions. Examples of different qubit materials can include, but is not limited to, silicon, photon, and electron materials.

The quantum service 122 may execute a machine-learning model trained to assign qubits to data files to determine the assignment for the data files 104 to the qubits 116. The machine-learning model can be trained using historical assignments of data files to qubits. Parameters of the machine-learning model can be adjusted until a loss function for the assignment is minimized. The machine-learning model can then receive an input of features of the data files 104 and output the assignment to the qubits 116.

The classical service 108 can receive the assignment of the qubits 116 for the data files 104 from the quantum service 122. Based on the assignment, the classical service 108 can generate the mapping 106 indicating the assignments of the qubits 116 for the data files 104. Along with the assignment, the quantum service 122 may additionally send an indication of properties 114 of the qubits 116 to the classical service 108. For example, the properties 114 can include a qubit identifier of each assigned qubit, the quantum computer system 120 associated with each assigned qubit, initial state information for each assigned qubit, or any other suitable properties. Examples of the initial state information can include a spin of a qubit or a polarization of a qubit.

In some examples, the classical service 108 can generate a quantum assembly language (QASM) file 112 that indicates the mapping 106 and the properties 114. The QASM file 112 may configure how the data files 104 interface with the qubits 116 of the quantum computer systems 120a-b. The classical service 108 can also set a process identifier associated with the QASM file 112 to match the specific process identifier that the quantum service 122 associated with the assigned qubits. Rather than the properties 114 indicating the initial state information, the classical service 108 may specify updated state information for one or more of the properties 114 in the QASM file 112. The updated state information can include at least one different value for a property than the initial state information. For example, the updated state information may indicate a different spin or polarization value for a qubit than the initial state information. The updated state information may be associated with a more optimal state for the qubits 116. The properties 114 included in the QASM file 112 may also include logical gates for the qubits 116.

In addition, the classical service 108 may generate the QASM file 112 to specify programmatic entanglement for each qubit 116 in the mapping 106. Programmatic entanglement can cause the state of each qubit 116 to depend on the state of the other qubits 116. If the qubits 116 indicated in the mapping 106 are spread across the quantum computer systems 120a-b, the QASM file 112 can programmatically entangle the qubits 116 across the quantum computer systems 120a-b.

Once the classical service 108 generates the QASM file 112, the server 110 may populate the QASM file 112 with logic specific to the software test suite 102. For example, the classical service 108 may be embedded within a continuous integration software development system and the generation of the QASM file 112 may trigger the continuous integration software development system to populate the logic. The logic can be execution logic specifying sequential steps for running the software test suite 102 with the assigned qubits 116 in superposition.

In some examples, the classical service 108 can then provide the QASM file 112 to the quantum computer systems 120a-b for execution. To begin the execution, the classical service 108 may request an execution of a testing process for the software test suite 102 by generating a request with the specific process identifier of the qubits 116 specified in the QASM file 112. One or more of the quantum computer systems 120a-b can detect the specific process identifier in the request and retrieve the QASM file 112.

The quantum computer systems 120a-b can execute the process according to the QASM file 112 and generate an output 118. Which quantum computer system executes the process can depend on which qubits are associated with the process. For example, if the data files 104 of the software test suite 102 are assigned to the qubits 116a-b of the quantum computer system 120a, then the quantum computer system 120a can execute the process according to the QASM file 112. The output 118 may indicate successes and failures of the execution of the data files 104. For example, the output 118 may indicate that the data file 104a associated with qubit 116a experienced a successful execution, whereas the data file 104b associated with qubit 116b experienced a failed execution. A successful execution is an execution in which a result of the execution is a desired result and a failed execution is an execution in which a result is an undesired result. The quantum computer system 120a can send the output 118 to the server 110.

Upon receiving the output 118, the server 110 can cause an action 124 based on the output 118. For example, the server 110 may determine that the output 118 indicates a failure of at least one of the data files 104. As a result, the server 110 can generate a notification of the failure or can stop a code push of the software application associated with the software test suite 102. Generating the notification or stopping the code push can ensure that the failure can be corrected before the software application is provided for use. Alternatively, the server 110 may determine that the output 118 indicates a success of the software test suite 102, where a success refers to a successful execution of each of the data files 104 of the software test suite 102. As a result, the server 110 can cause the action 124 by packaging the software application associated with the software test suite 102, distributing the software application, or pushing the software application for production.

In some examples, once the QASM file 112 is executed, the server 110 may send a notification 126 to the quantum computer system 120a. The notification 126 can cause the quantum computer system 120a to deallocate the qubits 116 for the data files 104. In addition, the notification 126 can cause the quantum computer system 120a to adjust each qubit 116 to have the updated state information specified in the properties 114 of the QASM file 112. Adjusting the qubits 116 to have the updated state information can ensure that the qubits 116 are reset so that, if any of the data files 104 have a failed execution, the qubits 116 are in an optimal state for re-running the execution.

Although FIG. 1 depicts a certain number and arrangement of components, other examples may include more components, fewer components, different components, or a different number of the components that is shown in FIG. 1. For instance, the system 100 can include more or less quantum computer systems than are shown in FIG. 1, each having a different number of qubits than are shown in FIG. 1. Additionally, while two data files is shown in FIG. 1, in other examples the software test suite 102 may include a different number of data files.

Figure 2:
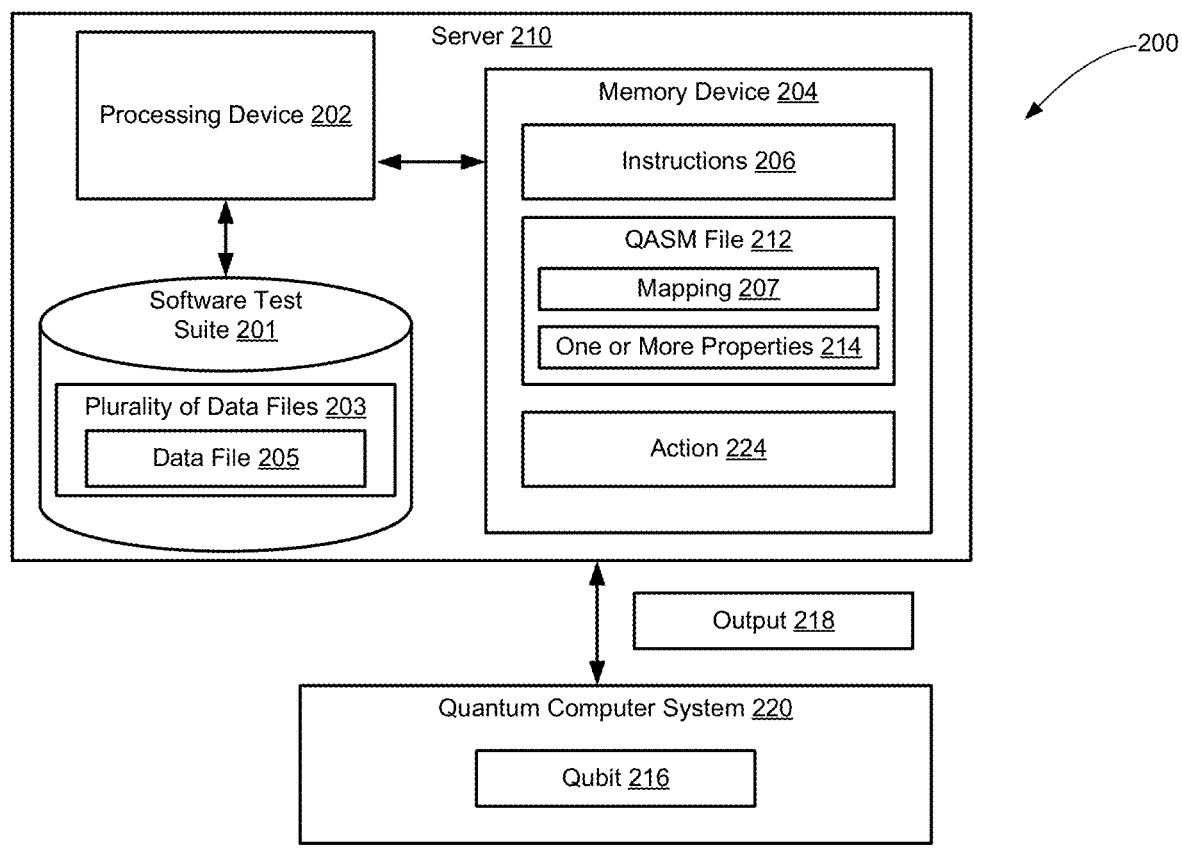
FIG. 2 is a block diagram of another example of a system for software testing using a quantum computer system according to one example of the present disclosure.

FIG. 2 is a block diagram of another example of a system 200 for software testing using a quantum computer system according to one example of the present disclosure. The system 200 includes a processing device 202 that is communicatively coupled to a memory device 204. In some examples, the processing device 202 and the memory device 204 can be part of the same computing device, such as the server 110. In other examples, the processing device 202 and the memory device 204 can be distributed from (e.g., remote to) one another.

The processing device 202 can include one processor or multiple processors. Non-limiting examples of the processing device 202 include a Field-Programmable Gate Array (FPGA), an application-specific integrated circuit (ASIC), or a microprocessor. The processing device 202 can execute instructions 206 stored in the memory device 204 to perform operations. The instructions 206 may include processor-specific instructions generated by a compiler or an interpreter from code written in any suitable computer-programming language, such as C, C++, C#, Java, or Python.

The memory device 204 can include one memory or multiple memories. The memory device 204 can be volatile or non-volatile. Non-volatile memory includes any type of memory that retains stored information when powered off. Examples of the memory device 204 include electrically erasable and programmable read-only memory (EEPROM) or flash memory. At least some of the memory device 204 can include a non-transitory computer-readable medium from which the processing device 202 can read instructions 206. A non-transitory computer-readable medium can include electronic, optical, magnetic, or other storage devices capable of providing the processing device 202 with computer-readable instructions or other program code. Examples of a non-transitory computer-readable medium can include a magnetic disk, a memory chip, ROM, random-access memory (RAM), an ASIC, a configured processor, and optical storage.

The processing device 202 can execute the instructions 206 to perform operations. For example, the processing device 202 of a server 210 can receive a software test suite 201 that includes plurality of data files 203. Each data file 205 of the plurality of data files 203 can correspond to a test of the software test suite 201. The processing device 202 can generate, by the server 210, a mapping 207 that assigns, for each data file 205, a qubit 216 of a quantum computer system 220 to the data file 205. The processing device 202 can generate, by the server 210, a QASM file 212 that indicates the mapping 207 and one or more properties 214 associated with the qubit 216 for each data file 205. The processing device 202 can provide, by the server 210, the QASM file 212 to the quantum computer system 220 for execution by the quantum computer system 220. The processing device 202 can cause, by the server 210, an action 224 based on an output 218 generated by the quantum computer system 220 in response to the execution of the QASM file 212. The output 218 can indicate successes and failures of the tests and the action 224 can depend on the successes and failures. Since the quantum computer system 220 can perform the tests by executing the QASM file 212 more quickly than a classical computer system can execute the tests, overall computing resources involved in evaluating the software test suite 201 can be reduced.

Figure 3:
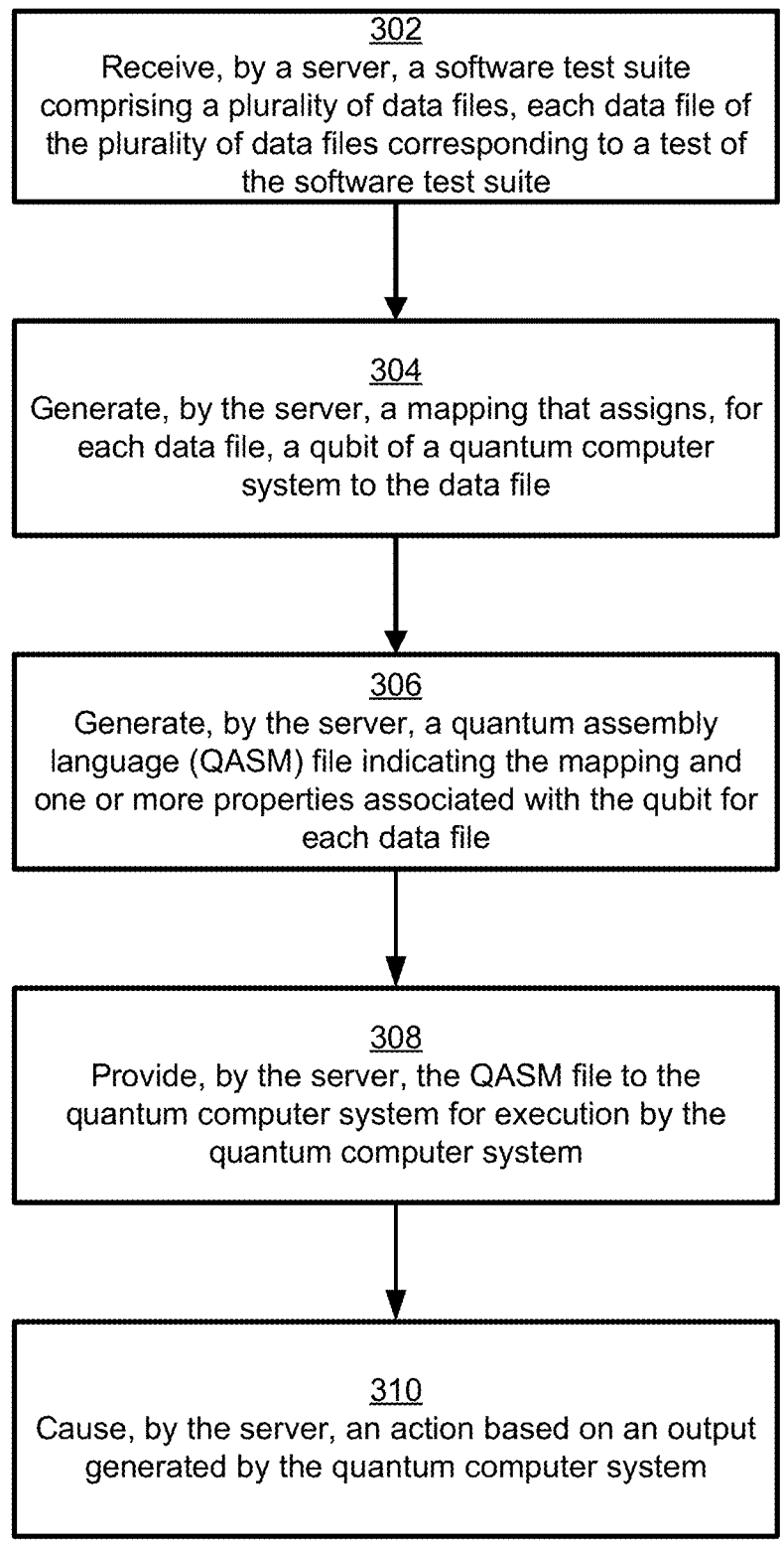
FIG. 3 is a flowchart of a process for software testing using a quantum computer system according to one example of the present disclosure.

FIG. 3 is a flowchart of a process for quantum computer system scheduling and parameterization based on error correction history according to one example of the present disclosure. In some examples, the processing device 202 can implement some or all of the steps shown in FIG. 3. Other examples can include more steps, fewer steps, different steps, or a different order of the steps than is shown in FIG. 3. The steps of FIG. 3 are discussed below with reference to the components discussed above in relation to FIG. 2.

In block 302, the processing device 202 can receive, by a server 210, a software test suite 201 that includes plurality of data files 203. Each data file 205 of the plurality of data files 203 can correspond to a test of the software test suite 201. The software test suite 201 may include all test cases that are to be evaluated for a software application or boundary value test cases for the software application.

In block 304, the processing device 202 can generate, by the server 210, a mapping 207 that assigns, for each data file 205, a qubit 216 of a quantum computer system 220 to the data file 205. A quantum service of a quantum computer system 220 can assign the qubit 216 for each data file 205. The assignment may be based on first available qubits, a material of the qubits, or a location of qubits 116 within the quantum computer system 220. The processing device 202 can receive the assignment from the quantum computer system 220 and generate the mapping 207 in accordance with the assignment.

In block 306, the processing device 202 can generate, by the server 210, a QASM file 212 that indicates the mapping 207 and one or more properties 214 associated with the qubit 216 for each data file 205. The one or more properties 214 can include a qubit identifier of the qubit 216 assigned to each data file 205, an identifier of the quantum computer system 120 associated with the qubit 216, state information for the qubit 216, or any other suitable properties. The state information can include a spin of the qubit 216 or a polarization of a qubit 216. The QASM file 212 may configure how the plurality of data files 205 interface with the qubit 216 of the quantum computer system 220. The processing device 202 can also set a process identifier associated with the QASM file 212 to match a process identifier that the quantum service associated with the qubit 216. The processing device 202 may generate the QASM file 212 to specify programmatic entanglement for the qubit 216 for each data file 205 in the mapping 207. Once the processing device 202 generates the QASM file 212, the processing device 202 may populate the QASM file 212 with logic specific to running a process associated with the software test suite 201.

In block 308, the processing device 202 can provide, by the server 210, the QASM file 212 to the quantum computer system 220 for execution by the quantum computer system 220. The processing device 202 may request an execution of a testing process for the software test suite 201 by generating a request with the specific process identifier of the qubits 216 specified in the QASM file 212. The quantum computer system 220 can execute the process according to the QASM file 212 and generate an output 218.

In block 310, the processing device 202 can cause, by the server 210, an action 224 based on the output 218 generated by the quantum computer system 220 in response to the execution of the QASM file 212. The output 218 may indicate successes and failures of the execution of the plurality of data files 203. For example, the output 218 may indicate that fifty three successful test cases and three failed test cases. For failed test cases, the action 224 can involve the processing device 202 generating a notification of the failure or halting a code push of the software application associated with the software test suite 201. If the plurality of data files 203 are each associated with a successful test case, the action 224 can involve the processing device 202 packaging the software application associated with the software test suite 201, distributing the software application, or pushing the software application for production.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, any examples described herein can be combined with any other examples to yield further examples.

The invention claimed is:

1. A method comprising:
   receiving, by a server, a software test suite comprising a plurality of data files, each data file of the plurality of data files corresponding to a test of the software test suite;
   generating, by the server, a mapping that assigns, for each data file, a qubit of a quantum computer system to the data file;
   generating, by the server, a quantum assembly language (QASM) file indicating the mapping and one or more properties associated with the qubit for each data file, the one or more properties being adjustable for each qubit and comprising one or more of a spin of the qubit, a polarization of the qubit, or an entanglement of the qubit;
   providing, by the server, the QASM file to the quantum computer system for execution by the quantum computer system; and
   causing, by the server, an action based on an output generated by the quantum computer system in response to the execution of the QASM file.

2. The method of claim 1, wherein generating the mapping comprises:
   receiving, for each data file, an assignment of the qubit, wherein the assignment is based on a characteristic of the software test suite or based on an execution of a machine-learning model trained to generate the mapping.

3. The method of claim 1, wherein generating the QASM file further comprises:
   specifying, in the QASM file, programmatic entanglement for each qubit in the mapping.

4. The method of claim 1, further comprising:
   receiving the one or more properties for each qubit, wherein the one or more properties indicate initial state information for the qubit for each data file; and
   specifying, in the QASM file, updated state information for the qubit, the updated state information including one or more different values than the initial state information.

5. The method of claim 4, further comprising:
subsequent to the execution of the QASM file, sending a notification to the quantum computer system, the notification being configured to:
cause the quantum computer system to deallocate the qubit for each data file; and
adjust the one or more properties to the updated state information.

6. The method of claim 1, further comprising:
determining that the output indicates a failure of at least one data file of the software test suite; and
causing the action by generating a notification of the failure or stopping a code push of a software application associated with the software test suite.

7. The method of claim 1, further comprising:
determining that the output indicates a success of the software test suite; and
causing the action by packaging a software application associated with the software test suite, distributing the software application, or pushing the software application for production.

8. A system comprising:
a processing device; and
a memory device including instructions executable by the processing device for causing the processing device to:
receive, by a server, a software test suite comprising a plurality of data files, each data file of the plurality of data files corresponding to a test of the software test suite;
generate, by the server, a mapping that assigns, for each data file, a qubit of a quantum computer system to the data file;
generate, by the server, a quantum assembly language (QASM) file indicating the mapping and one or more properties associated with the qubit for each data file, the one or more properties being adjustable for each qubit and comprising one or more of a spin of the qubit, a polarization of the qubit, or an entanglement of the gubit;
provide, by the server, the QASM file to the quantum computer system for execution by the quantum computer system; and
cause, by the server, an action based on an output generated by the quantum computer system in response to the execution of the QASM file.

9. The system of claim 8, wherein the memory device further includes instructions executable by the processing device for causing the processing device to generate the mapping by:
receiving, for each data file, an assignment of the qubit, wherein the assignment is based on a characteristic of the software test suite or based on an execution of a machine-learning model trained to generate the mapping.

10. The system of claim 8, wherein the memory device further includes instructions executable by the processing device for causing the processing device to further generate the QASM file by:
specify programmatic entanglement each qubit in the mapping.

11. The system of claim 8, wherein the memory device further includes instructions executable by the processing device for causing the processing device to:
receive the one or more properties for each qubit, wherein the one or more properties indicate initial state information for the qubit for each data file; and
specify, in the QASM file, updated state information for the qubit, the updated state information including one or more different values than the initial state information.

12. The system of claim 11, wherein the memory device further includes instructions executable by the processing device for causing the processing device to:
subsequent to the execution of the QASM file, send a notification to the quantum computer system, the notification being configured to:
cause the quantum computer system to deallocate the qubit for each data file; and
adjust the one or more properties to the updated state information.

13. The system of claim 8, wherein the memory device further includes instructions executable by the processing device for causing the processing device to:
determine that the output indicates a failure of at least one data file of the software test suite; and
cause the action by generating a notification of the failure or stopping a code push of a software application associated with the software test suite.

14. The system of claim 8, wherein the memory device further includes instructions executable by the processing device for causing the processing device to:
determine that the output indicates a success of the software test suite; and
cause the action by packaging a software application associated with the software test suite, distributing the software application, or pushing the software application for production.

15. A non-transitory computer-readable medium comprising program code that is executable by a processing device for causing the processing device to:
receive, by a server, a software test suite comprising a plurality of data files, each data file of the plurality of data files corresponding to a test of the software test suite;
generate, by the server, a mapping that assigns, for each data file, a qubit of a quantum computer system to the data file;
generate, by the server, a quantum assembly language (QASM) file indicating the mapping and one or more properties associated with the qubit for each data file, the one or more properties being adjustable for each qubit and comprising one or more of a spin of the qubit, a polarization of the qubit, or an entanglement of the qubit;
provide, by the server, the QASM file to the quantum computer system for execution by the quantum computer system; and
cause, by the server, an action based on an output generated by the quantum computer system in response to the execution of the QASM file.

16. The non-transitory computer-readable medium of claim 15, further comprising program code that is executable by the processing device for causing the processing device to generate the mapping by:
receiving, for each data file, an assignment of the qubit, wherein the assignment is based on a characteristic of the software test suite or based on an execution of a machine-learning model trained to generate the mapping.

17. The non-transitory computer-readable medium of claim 15, further comprising program code that is executable by the processing device for causing the processing device to:

receive the one or more properties for each qubit, wherein the one or more properties indicate initial state information for the qubit for each data file; and specify, in the QASM file, updated state information for the qubit, the updated state information including one or more different values than the initial state information.

18. The non-transitory computer-readable medium of claim 17, further comprising program code that is executable by the processing device for causing the processing device to:

subsequent to the execution of the QASM file, send a notification to the quantum computer system, the notification being configured to:

cause the quantum computer system to deallocate the qubit for each data file; and adjust the one or more properties to the updated state information.

19. The non-transitory computer-readable medium of claim 15, further comprising program code that is executable by the processing device for causing the processing device to:

determine that the output indicates a failure of at least one data file of the software test suite; and cause the action by generating a notification of the failure or stopping a code push of a software application associated with the software test suite.

20. The non-transitory computer-readable medium of claim 15, further comprising program code that is executable by the processing device for causing the processing device to:

determine that the output indicates a success of the software test suite; and cause the action by packaging a software application associated with the software test suite, distributing the software application, or pushing the software application for production.

* * * * *